(12) United States Patent
Casagrande

(10) Patent No.: US 6,575,305 B1
(45) Date of Patent: Jun. 10, 2003

(54) ARRANGEMENT FOR IDENTIFYING AND REMOVING ASSOCIATED PREFORMS FROM A CONTINUOUS TRANSFER LINE

(75) Inventor: Luciano Casagrande, Codognè (IT)

(73) Assignee: Sipa S.p.A., Vittorio Veneto (IT)

( * ) Notice: Subject to any disclaimer, the term of this patent is extended or adjusted under 35 U.S.C. 154(b) by 0 days.

(21) Appl. No.: 09/787,005

(22) PCT Filed: Sep. 4, 1999

(86) PCT No.: PCT/EP99/06516
§ 371 (c)(1),
(2), (4) Date: Mar. 12, 2001

(87) PCT Pub. No.: WO00/23254
PCT Pub. Date: Apr. 27, 2000

(30) Foreign Application Priority Data

Oct. 20, 1998 (IT) .......................................... PN98A0074

(51) Int. Cl.[7] ................................................ B07C 5/34
(52) U.S. Cl. ........................ 209/616; 209/701; 209/707; 198/455
(58) Field of Search ................................ 209/616, 701, 209/707, 924; 198/455, 398, 389

(56) References Cited

U.S. PATENT DOCUMENTS

| | | | | |
|---|---|---|---|---|
| 2,813,616 A | * | 11/1957 | Ferguson et al. | 209/616 |
| 2,861,685 A | * | 11/1958 | Cordis | 209/616 |
| 2,911,088 A | | 11/1959 | Ingham, Jr. et al. | |
| 3,344,901 A | * | 10/1967 | Schultz | 209/707 |
| 3,369,642 A | * | 2/1968 | Hennig | 198/389 |
| 3,811,551 A | * | 5/1974 | Eddy | 198/455 |
| 4,244,459 A | * | 1/1981 | Garrett | 198/389 |
| 4,350,251 A | * | 9/1982 | Merck | 209/642 |
| 5,186,307 A | * | 2/1993 | Doudement et al. | 198/454 |

FOREIGN PATENT DOCUMENTS

| | | |
|---|---|---|
| EP | 0511048 A1 | 10/1992 |
| EP | 0859392 A2 | 8/1998 |

* cited by examiner

Primary Examiner—Douglas Hess
(74) Attorney, Agent, or Firm—Wenderoth, Lind & Ponack, L.L.P.

(57) ABSTRACT

An apparatus transfers performs traveling along an inclined path from an upper loading station to a lower unloading station. The apparatus includes a device that includes plural rotary forks which rotate so as to engage and remove from the inclined path performs that are joined together.

21 Claims, 7 Drawing Sheets

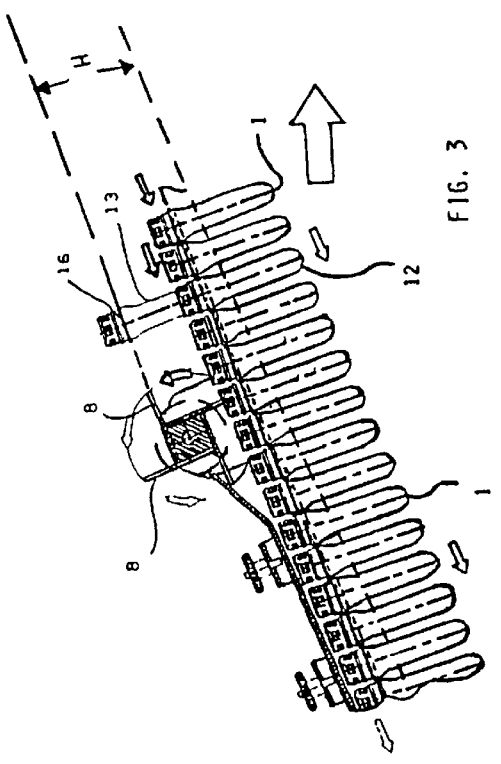
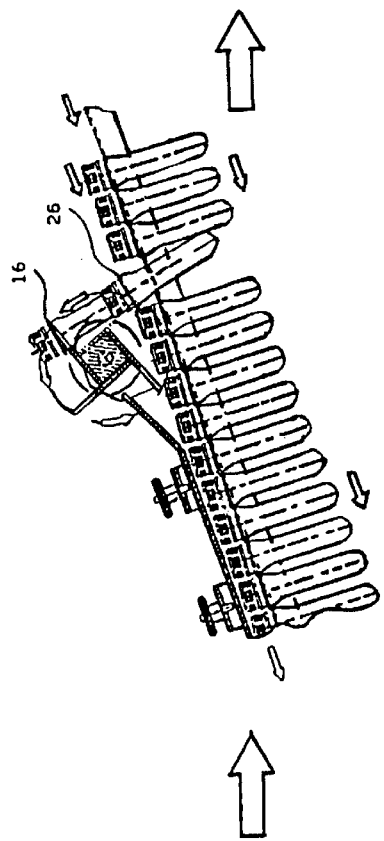
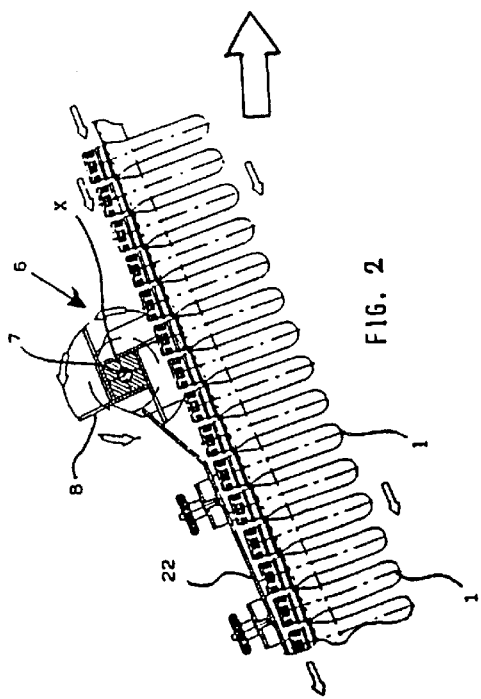
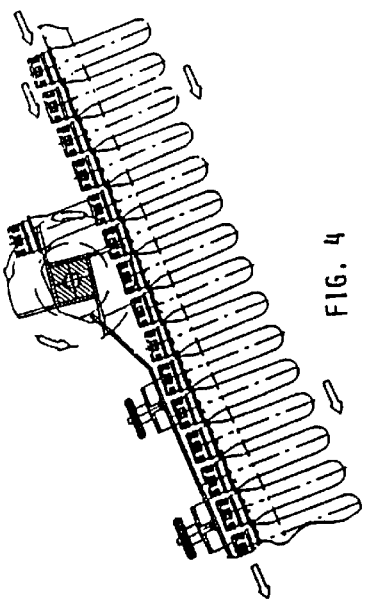

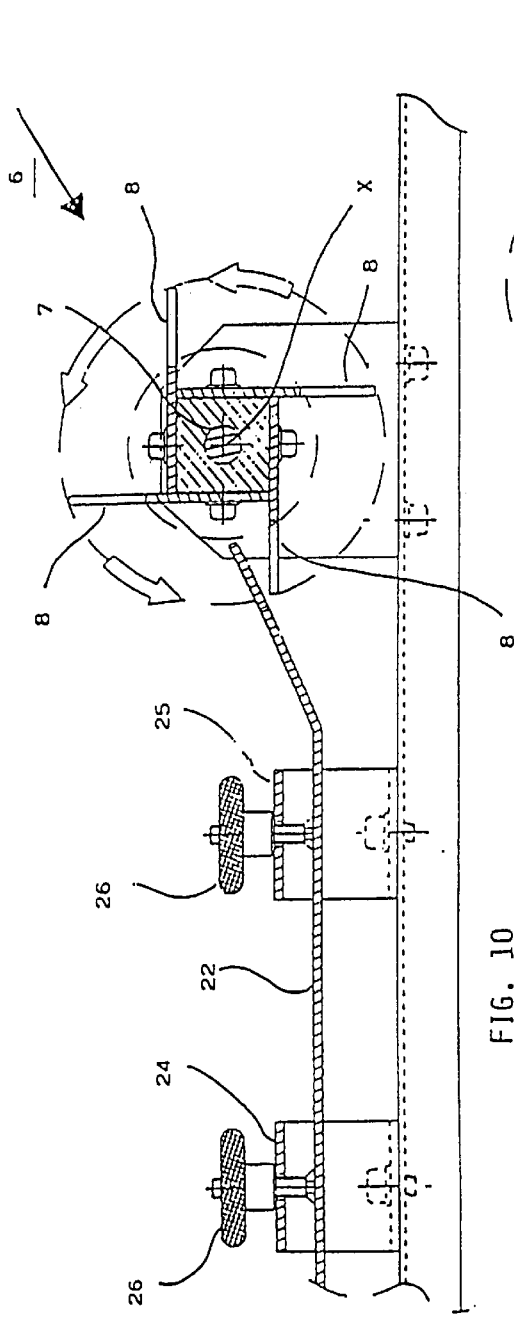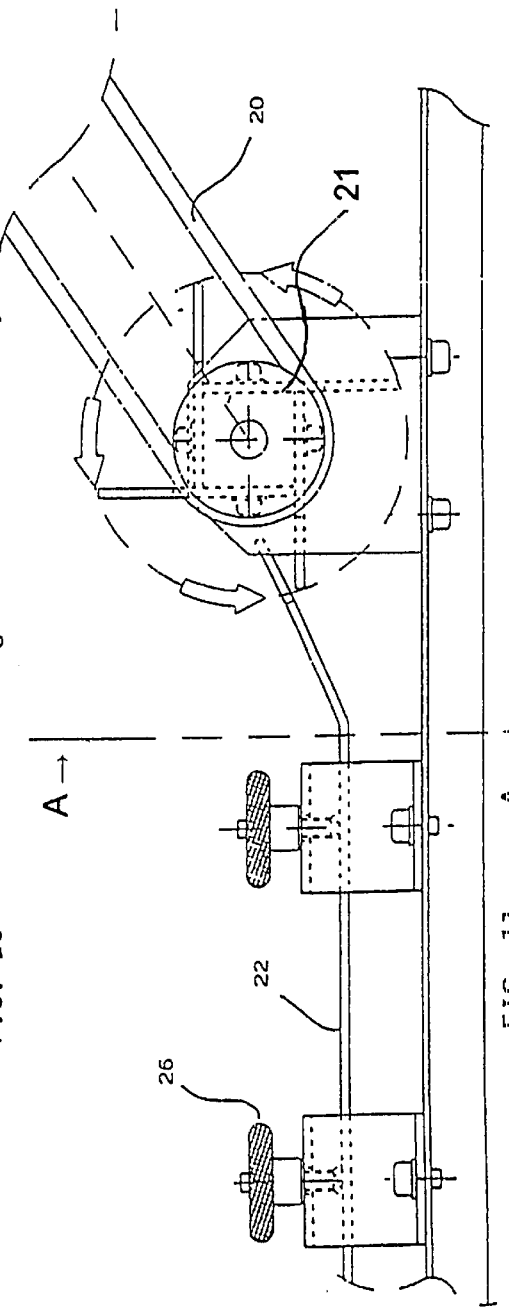

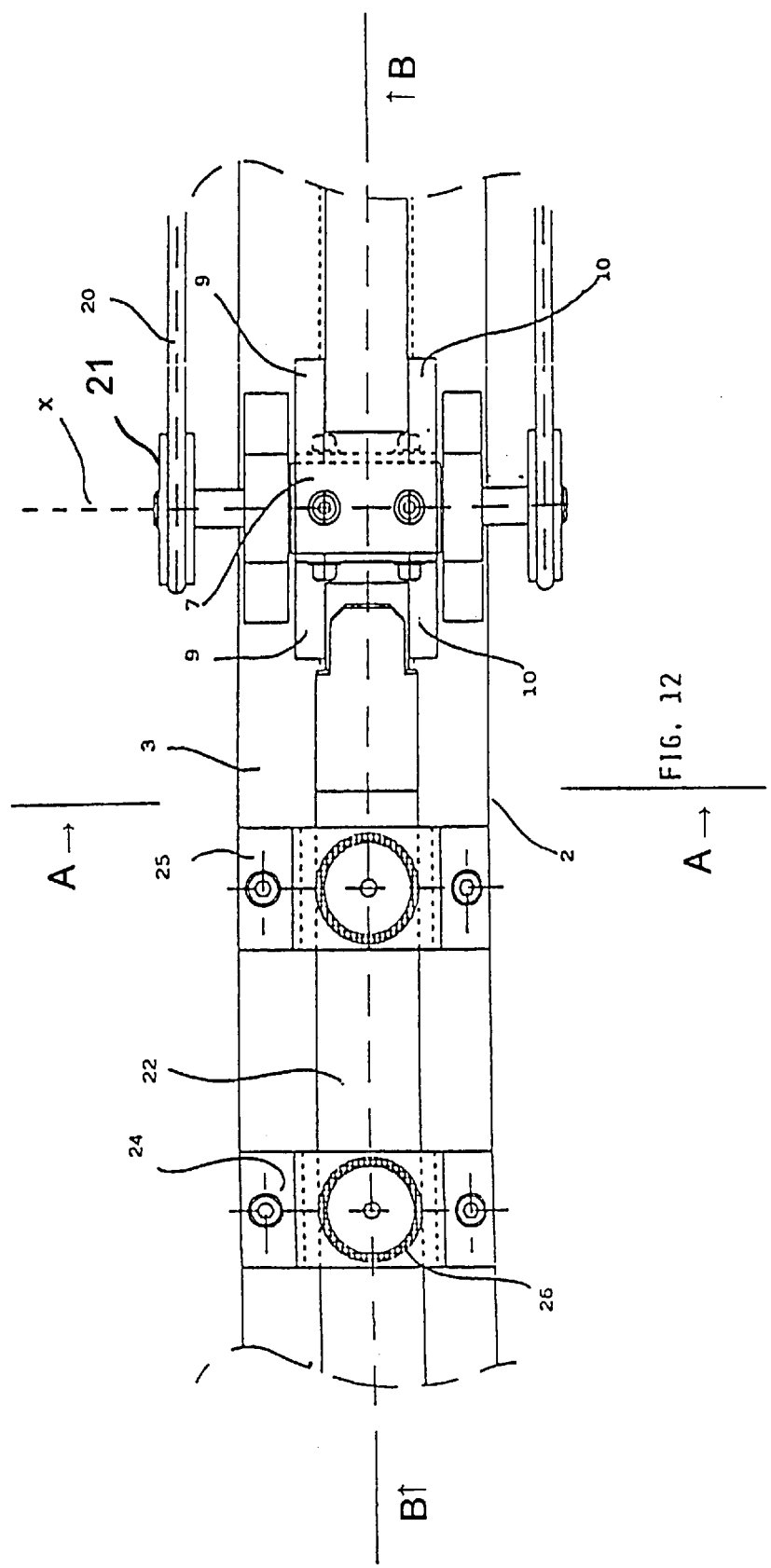

ARRANGEMENT FOR IDENTIFYING AND REMOVING ASSOCIATED PREFORMS FROM A CONTINUOUS TRANSFER LINE

BACKGROUND OF THE INVENTION

The present invention pertains to an apparatus for singularizing and transferring preforms made of thermoplastic material, in particular polyethylene terephtalate (PET and polypropylene (PP), intended for use in applications requiring them to be subsequently blow molded into containers adapted to be filled with liquids of various kinds, especially alimentary liquids, beverages and the like.

Processes for production of such types of containers are generally known so as to be able to be schematically divided into two basic types, i.e. a single-stage process and a two-stage process.

In a two-stage process, a previously produced preform or parison, which is in a substantially amorphous state, is heated up again to its preferred molecular orientation temperature, at which it is then blow-molded into a desired shape. As used in this context, the term "two-stage process" or "double-stage process", shall be understood to cover any process that produces a preform or parison which must then be heated up from ambient temperature to a related blow-molding temperature.

In contrast therewith, single-stage processes are so defined in that they are capable of forming the so-called preform, or parison, and transferring the preform from an injection mold or extrusion die (upon it having been allowed to cool down to some appropriate temperature) to a conditioning station, where it is allowed to evenly level at a temperature of preferred molecular orientation. The preform or parison is then transferred to a blow-molding die, in which it is finally molded into its desired form.

In particular, the present invention is particularly advantageous when it is associated with a preform manufacturing apparatus including a so-called two-stage plant for performing the two-stage process as defined above, but can be advantageously used also in conjunction with single-stage plants for performing the single stage process as defined above.

As a matter of fact, a need may arise in such types of plants for intermediate buffers or temporary storage units to be created as preform holding facilities, and cases in which this is required, as well as ways in which the buffers and related handling structure can be implemented, are exhaustively described in a detailed manner in Italian Patent Application No. PN97A000007 to ZOPPAS, to which reference is hereby made.

It is therefore a generally known fact that handling of preforms in view of subsequent processes and treatments must necessarily include a preform singularization step, i.e. a kind of operation in which the preforms are picked singularly from an initial container in which they are stored in bulk, in particular a rotary hopper, and are lined up along a transfer device from which the preforms can then be removed or collected in a desired quantity for subsequent processing or treatment steps.

Such a container is usually associated with a further apparatus that singularizes a preform, i.e. separates it from other preforms and prearranges it so as to be able to be sent or conveyed to an appropriate sliding or move-along line, and from this sliding line, which is essentially constituted by a simple groove delimited on both sides thereof by two guide and support rails provided in an arrangement that slopes down from an initial station to a final or terminal station, the preforms are able to slide along such a groove by simple gravity.

The preforms fit with a central portion of their cylindrical body into the groove and are supported by two side rails which intercept an upper rim or collar of the performs, immediately below threads on the preforms.

When so fitted in the groove, the preforms start to glide downwardly, in contact with each other, in an orderly sequence, so as to be appropriately prearranged for being picked up by suitable removal devices.

It has however been found, both experimentally and in practice, that such a method and related machines that carry it out, although simple and reliable, have a drawback that quite frequently forces the same machines to be stopped and be rearranged, i.e. reset manually. Accordingly, the machines have to be practically run under almost constant attendance of appropriate personnel.

Such a drawback, quite banal in its nature, is due to the fact that certain preforms, which are stored in bulk in the aforementioned initial container, may accidentally end up being inserted one within another. In particular, when the container is a rotary hopper, and, owing to possible impacts or pressures exterted upon the performs and friction between surfaces made of the same plastic material, the preforms are not able to be released from each other, i.e. separate from each other by themselves, but remain so stuck "in pairs" also in subsequent phases of the process.

In particular, these "pairs" of preforms stuck into each other are regularly singularized and loaded onto a sloping transfer line and, when they reach a terminal station where they are then picked up, they present themselves as a single preform that is almost double in its length.

Such a circumstance is detected by control devices provided for this purpose, which therefore respond by immediately and automatically shutting down the plant. To restore operation of the plant, and of course remove the preforms so stuck together, presence of an operator is required and this requirement, along with the production loss brought about by such a shutdown of the plant, gives rise to an additional burden that is neither predictable nor quantifiable.

SUMMARY OF THE INVENTION

Based on these considerations, it therefore is a main purpose of the present invention to provide an arrangement and a method concerning a preform transfer phase. Specifically, the arrangement and method are capable of doing away with the above cited drawback, so as to prevent overall plant productivity from being jeopardized, and which are capable of being easily implemented with aid of readily available techniques and devices, and therefore are reasonably low in cost and reliable and capable of being fully integrated with a preform production stage. The preform production stage may be provided upstream of the arrangement.

This aim, along with further features of the present invention, are reached in an arrangement for automatic removal of mutually associated preforms operating as recited in this specification.

BRIEF DESCRIPTION OF THE DRAWINGS

A preferred embodiment of the present invention is described in detail and illustrated below by way of non-limiting example with reference to the accompanying drawings, in which:

FIG. 2 is a side view of an arrangement according to the present invention;

FIG. 3 is a view of the arrangement shown in FIG. 2, but with an approaching preform inserted within a second preform;

FIGS. 4 to 9 are side views of respective subsequent phases in which mutually associated preforms are grasped, lifted and ejected from the transfer line by virtue of an apparatus according to the present invention;

FIGS. 10 and 11 are enlarged views of an arrangement according to the present invention, without and with a rotary-motion driving belt, respectively;

FIG. 12 is a top view of the arrangement according to the present invention shown in FIG. 11, which is shown jointly with a portion of the corresponding transfer line;

DETAILED DESCRIPTION OF THE PREFERRED EMBODIMENTS

Figure 1:
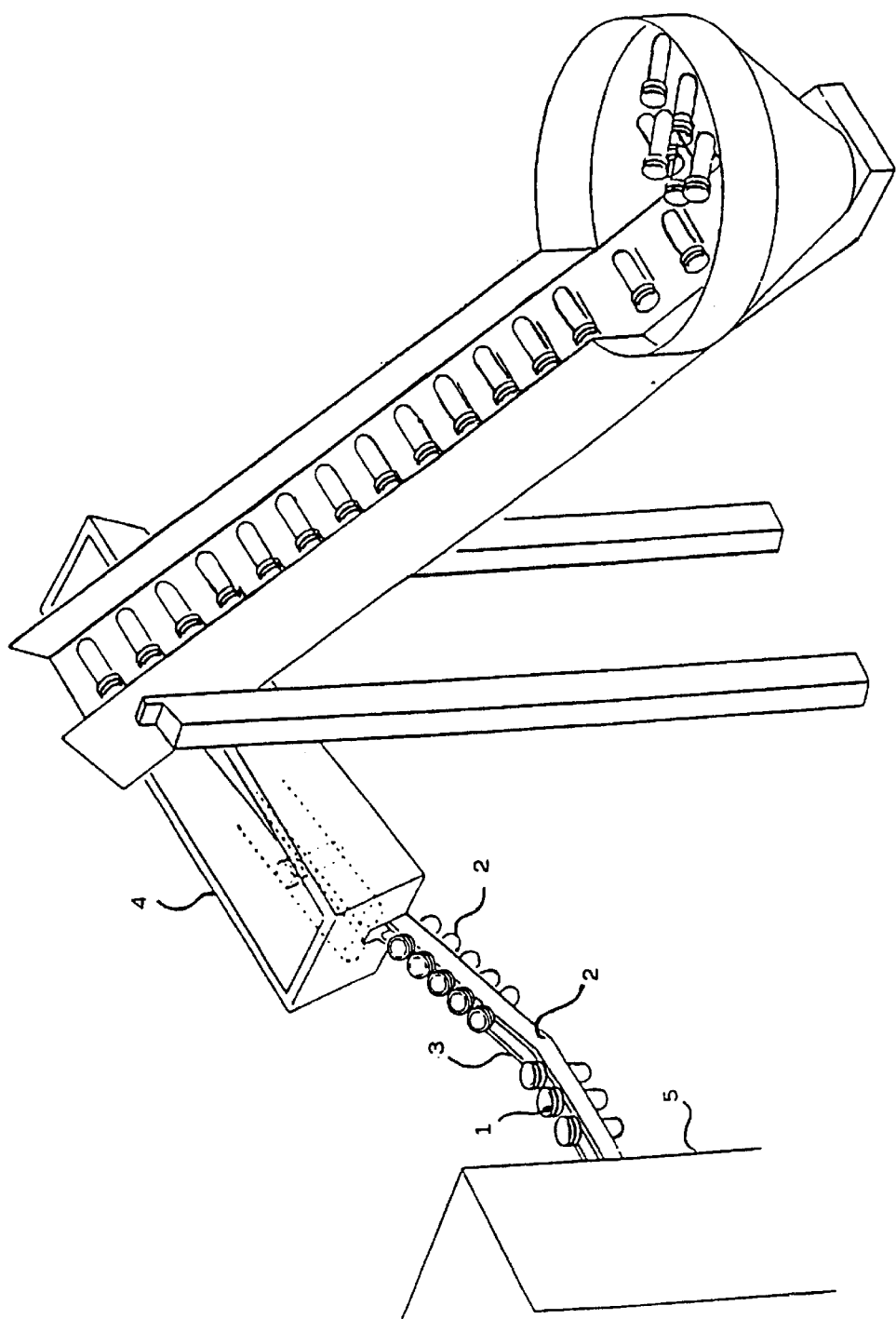
FIG. 1 is a view of a preform handling and transfer plant comprising a preform transfer line on which an arrangement according to the present invention can be installed.
Figure 6:
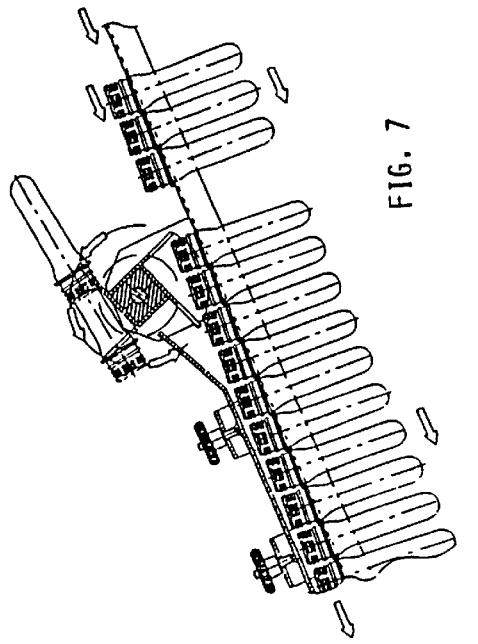
Figure 7:
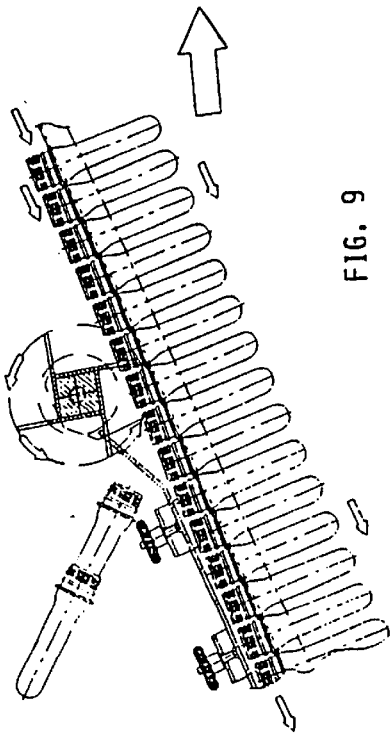
Figure 8:
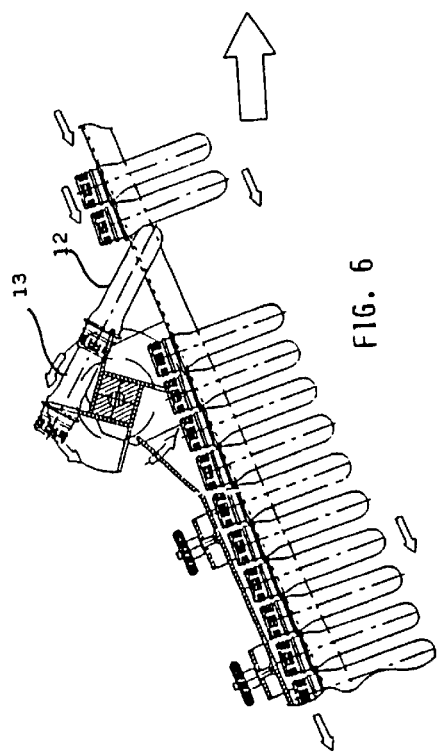

With reference to the Figures, they can be noticed to illustrate a sequence of preforms 1 entering in an orderly line a pair of parallel rails 2, 3 that are inclined with respect to a horizontal plane so as to enable the preforms to glide along by gravity from an upper loading station 4 down to a lower unloading station 5. Above the rails, in an intermediate position thereof, there is installed an arrangement 6 comprising a central structure 7 that is adapted to rotate about a horizontal axis X.

On this central structure 7 there are attached a plurality of forks 8 projecting from respective outer portions of said central structure 7, which are contained within planes that do not pass through the rotation axis X, and are substantially arranged above the rails and in such a manner as to ensure that the position of any of the forks is determined by rotation about the axis X of any other of the forks. On the other hand, the configuration and arrangement of the forks 8 can be clearly and unmistakably recognized and understood from the illustrations appearing in the accompanying Figures.

Furthermore, the forks 8 are such as to comply with the following additional requirements:

a) side arms 9, 10 of the forks are substantially parallel and are spaced from each other by a separation distance Z that is greater than an outside diameter of a threaded portion of the preforms passing by, but less than a diameter of a collar of the same preforms;

b) a disposition and size of the central structure 7 together with the forks 8 are such as to ensure that the forks, when rotating into their lowest position, do not interfere with the parallel rails 2, 3, while their side arms move from opposite sides very close to the threaded portions of the preforms gliding along below the central structure; and c) given two preforms of the same type that are inserted into each other so as to form a special pair of preforms, in which an outer or lower preform is indicated at 12 and an inner or upper preform is indicated at 13, shown in FIG. 14, when such special pair of preforms 12 and 13 are loaded onto a transfer line within the pair of parallel rails 2, 3, a height of collar 16 of the upper preform 13 comes to be substantially at the same level or height H of the side arms 9, 10 of the forks 8 when the side arms are arranged in a plane that is substantially parallel to the rails, as shown in the Figures.

Any further feature or characteristic of the forks 8, the central structure and their mutual fastening and disposition relative to the pair of rails 2, 3, can be clearly inferred from the Figures and is readily deducible by those skilled in the art, so that a detailed description thereof is intentionally omitted here for reasons of brevity.

The operation of the above described arrangement is as follows:

With reference to FIG. 1, it can be noticed how the preforms 1 are normally sent by gravity along a transfer line, constituted by the two rails 2 and 3, so as to move from the loading station 4 to the unloading station 5.

Such a situation of normality is illustrated in greater detail in FIG. 2, which shows also the positioning and, albeit schematically, the structure of the arrangement 6 according to the present invention.

In this situation of normality, the preforms 1 glide along within a gap or groove formed between the two rails 2 and 3 and move below the arrangement 6 without being intercepted. In fact, the forks 8, which rotate in the direction shown in the Figures, i.e. in such a manner that the direction of their movement, when they are at their lowest position, is opposite of the direction of movement of the preforms 1 gliding along by gravity, are able to neither touch the rails 2, 3, since their length does not allow this to happen nor the threaded portion-of the preforms, since the side arms 9, 10, although lowering to a level of the threaded portion, are separated and spaced from each other-by an extent enabling them to move laterally past the threaded portion on opposite sides thereof without contacting the threaded portion. As a result, motion of regular preforms 1 is not stopped or altered in any way.

Figure 14:
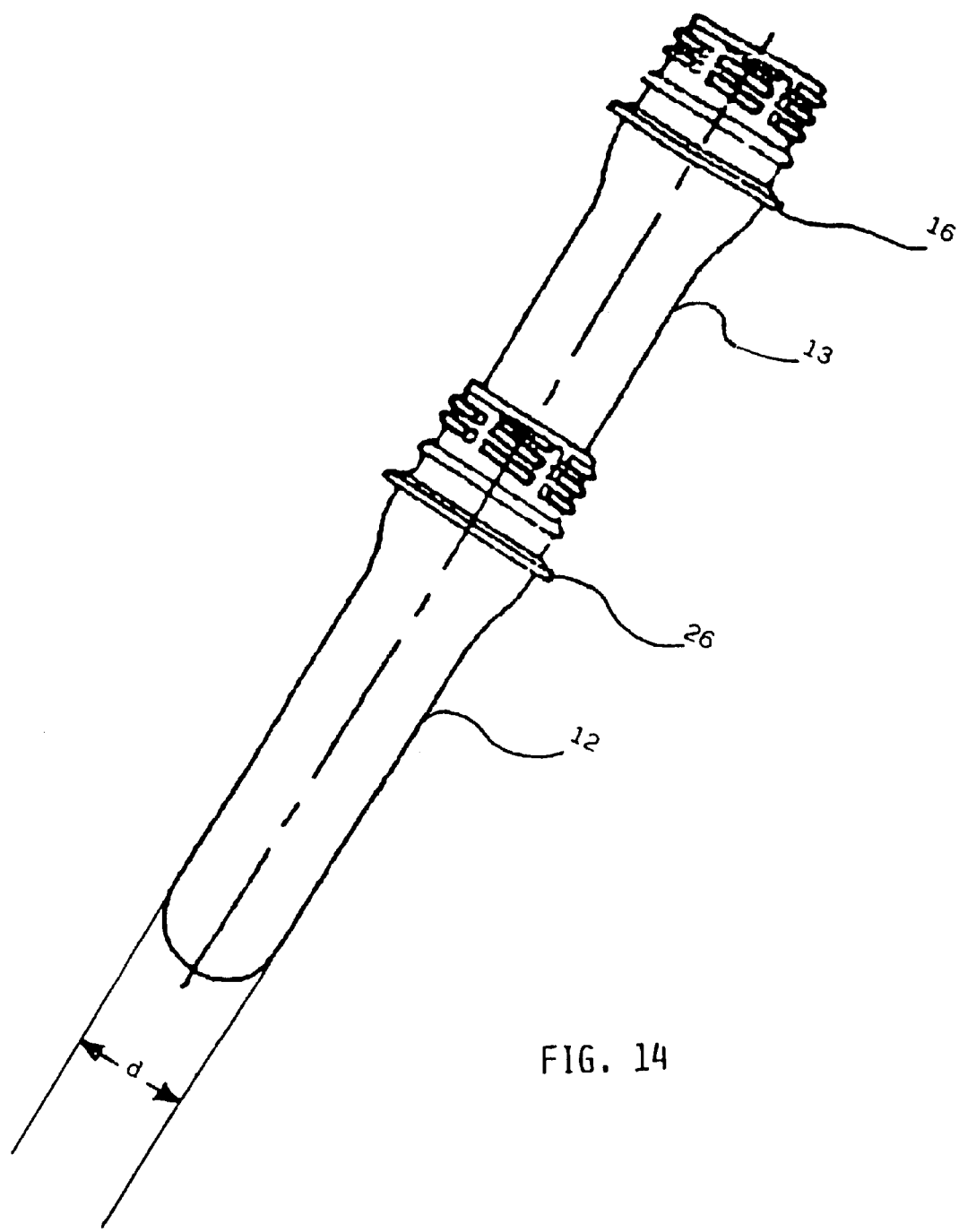
FIG. 14 is a side view of two preforms that are stuck one into another, in a state in which they must therefore desirably be removed from production flow by virtue of the arrangement according to the present invention.

Conversely, when mutually inserted or stuck preforms 12 and 13, as shown in FIG. 14, are loaded into the rails 2 and 3 by the loading station 4, these preforms present themselves on the transfer line as illustrated in FIG. 3, i.e. with the upper inner preform 13 having its collar 16 at a height H that corresponds to a height of one of the forks 8 when it is rotated so that its side arms 9, 10, arrange themselves on the inclined plane extending parallel to the rails.

Figure 9:
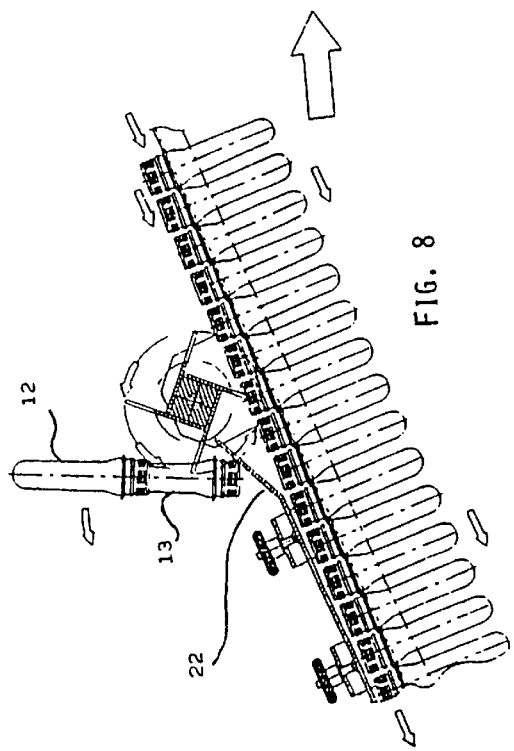

When these preforms 12, 13, as supported by the collar 26 of the lower preform 12 resting on the rails 2, 3, move towards the arrangement 6, one of the rotating fork 8 glides initially, without engaging these performs, along flanks of a body of the upper preform 13, until the collar 16 of the upper preform is eventually grasped by the same fork, as shown in FIG. 4. Accordingly, this preform 13 is first lifted by the fork 8 and then rotated, as illustrated in FIGS. 5 through to 9, whereby the preform 13 carries with it the perform 12, within which the preform 13 is inserted. Accordingly, after having been so removed from the continuous sequence of regular preforms 1, the preforms 12 and 13 are ejected backwards by jetting them drop freely, as shown in FIG. 9. Such an effect actually achieves the purpose of the present invention.

The above described arrangement can be further improved through the implementation of some variants that are aimed at increasing effectiveness and utilization scope thereof. A first such measure consists in giving the various component pants of the central structure 7 and the forks 8 such dimensions, shape and rotational speeds as to enable them to intercept and remove a plurality of pairs of mutually inserted preforms that may come up in a continuous sequence along the rails 2, 3. Such an occurrence, although rather uncommon in practice, must anyway be taken into account in view of adequately counteracting it, i.e. eliminating it, since it only takes just one of the pairs of preforms 12, 13, escaping a filtering action of the arrangement 6 and the resulting removal from the line, to bring about a shutdown of an entire plant.

Selection and definition of geometric and dimensional features, as well as an amount and angular velocity of the forks, so as to obtain the desired result, are fully within the capability of those skilled in the art, so that their description in detail will be intentionally omitted here for reasons of brevity.

A further improvement can be obtained by letting the forks 8 rotate continuously, so as to do away with a constructional complication of having to provide forks that only start to move when activated by special sensors detecting passage of pairs of mutually inserted preforms 12, 13, that are desirable to remove from the line.

Figure 13:
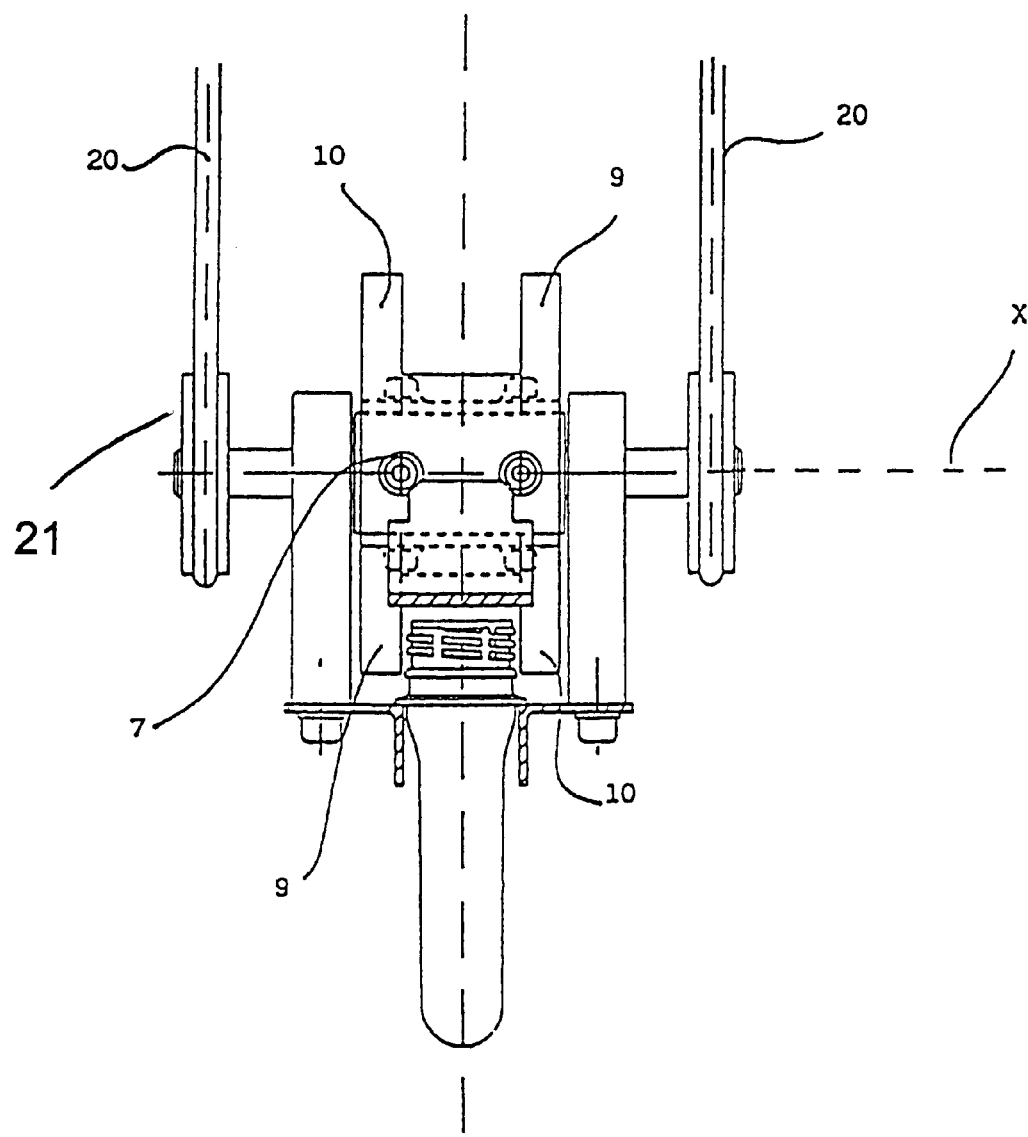
FIG. 13 is a view of section A—A of the arrangement according to the present invention shown in FIG. 11.

In particular, the continuousness of the rotational motion of the forks 8 and the central structure 7 is advantageously obtainable by virtue of at least a drive belt 20 adapted to engage a respective appropriate pulley 21 shrink-fitted onto the central structure 7, as shown in FIGS. 11, 12 and 13.

Finally, with reference to FIGS. 10, 11 and 12, a useful improvement is offered by providing a protection member 22 arranged between a portion of the rails 2, 3, situated downstream of the arrangement 6 and portions of the rails 2, 3, situated therebelow. Such a protection member 22, which may possibly be properly bent in view of increasing its protection effectiveness, has a task of intercepting pairs of mutually inserted preforms 12, 13, as they are ejected and unloaded behind the arrangement 6. In fact such preforms, if not otherwise diverted, would automatically disengage, i.e. drop by gravity after approximately half a turn, and would therefore fall exactly onto the preforms 1 that are regularly arranged on the rails 2, 3, downstream of the arrangement 6, with a risk of damaging and/or altering the regular sequence of the preforms 1.

In view of doing away with such a risk, the protection member 22 is arranged downstream of the arrangement 6, and immediately above the preforms 1, so as to protect the preforms 1 against falling preforms that are released and dropped thereabove, wherein the protection member can be applied to the rails 2, 3, by virtue of several fastening members 24, 25. These fastening members 24, 25, are constituted preferably by bridge-like brackets provided with suitable structure, preferably screws 26 or the like, adapted to allow for the protection member 22 to be locked in position or to be released for any operational or maintenance requirement.

It will be appreciated that, although described based on the example of preferred embodiments thereof and using a commonly known terminology, the present invention shall by no means be considered as being limited by such a description and such a terminology, since those skilled in the art are capable of devising and introducing a number of modifications. The appended claims shall therefore be intended to extend to and cover such obvious modifications.

What is claimed is:

1. An apparatus for transferring preforms from an upper loading station to a lower unloading station, comprising:

two inclined parallel rails extending from said upper loading station to said lower unloading station, said two inclined parallel rails being separated by a gap that is arranged to receive plural preforms therein and allow said plural preforms to travel in an orderly sequence between said two inclined parallel rails; and a device that is adapted to intercept and remove, from said plural preforms, a joined preform that has one preform positioned within another preform while the another preform is supported by said two inclined parallel rails via a collar of the another preform engaging said two inclined parallel rails such that a collar of the one preform is spaced from an upper edge of said two inclined parallel rails by a distance that is greater than a predetermined value, wherein said device includes plural rotary forks, each of said plural rotary forks including two outer parallel arms that are positioned above said two inclined parallel rails, said plural rotary forks being rotatable about a common axis such that said two outer parallel arms of each of said plural rotary forks is capable of moving into a first position at which the collar of the one preform is engaged by a respective said two outer parallel arms and a second position at which said respective said two parallel arms lift and rotate the one and the another preform from said gap so as to remove and eject the joined preform from said two inclined parallel rails.

2. The apparatus according to claim 1, wherein end portions of said two outer parallel arms of each of said plural rotary forks are spaced from one another by a distance that is greater than both a diameter of a threaded portion of the plural preforms and a diameter of a cylindrical portion of the plural preforms that is positioned below a collar of the plural preforms.

3. The apparatus according to claim 2, wherein the common axis about which said plural rotary forks are rotatable is positioned above said gap and extends transversely relative to a vertical plane passing through said gap.

4. The apparatus according to claim 3, wherein said plural rotary forks are angularly spaced from one another and continuously rotatable about the common axis at a rate such that said two outer parallel arms of each of said plural rotary forks are capable of moving into the first position at which collars of respective one preforms of successively adjacent joined preforms are engaged by respective said two outer parallel arms and the second position at which said respective said two outer parallel arms lift and rotate the respective one preforms and respective another preforms of the successively adjacent joined preforms from said gap so as to remove and eject the successively adjacent joined preforms from said two inclined parallel rails.

5. The apparatus according to claim 4, wherein said two outer parallel arms of each of said plural forks are adapted to assume an orientation that is parallel to said two inclined parallel rails when a distance between a respective said two outer parallel arms and said two inclined parallel rails is at most equal to the distance between the upper edge of said two inclined parallel rails and the collar of the one preform.

6. The apparatus according to claim 5, further comprising a bracket-like member removably attached to said two inclined parallel rails via fastening members downstream of said device, said bracket-like member being situated above said two inclined parallel rails so as to function as a protection member for the plural preforms travelling along said two inclined parallel rails.

7. The apparatus according to claim 6, wherein said device further includes a pulley and a belt passing over said pulley such that said plural rotary forks are continuously rotatable about the common axis via cooperation of said belt and said pulley.

8. The apparatus according to claim 2, wherein said two outer parallel arms of each of said plural forks are adapted to assume an orientation that is parallel to said two inclined parallel rails when a distance between a respective said two outer parallel arms and said two inclined parallel rails is at most equal to the distance between the upper edge of said two inclined parallel rails and the collar of the one preform.

9. The apparatus according to claim 6, further comprising a bracket-like member removably attached to said two inclined parallel rails via fastening members downstream of said device, said bracket-like member being situated above said two inclined parallel rails so as to function as a protection member for the plural preforms travelling along said two inclined parallel rails.

10. The apparatus according to claim 2, wherein said device further includes a pulley and a belt passing over said pulley such that said plural rotary forks are continuously rotatable about the common axis via cooperation of said belt and said pulley.

11. The apparatus according to claim 3, wherein said two outer parallel arms of each of said plural forks are adapted to assume an orientation that is parallel to said two inclined parallel rails when a distance between a respective said two outer parallel arms and said two inclined parallel rails is at most equal to the distance between the upper edge of said two inclined parallel rails and the collar of the one preform.

12. The apparatus according to claim 3, further comprising a bracket-like member removably attached to said two inclined parallel rails via fastening members downstream of said device, said bracket-like member being situated above said two inclined parallel rails so as to function as a protection member for the plural preforms travelling along said two inclined parallel rails.

13. The apparatus according to claim 3, wherein said device further includes a pulley and a belt passing over said pulley such that said plural rotary forks are continuously rotatable about the common axis via cooperation of said belt and said pulley.

14. The apparatus according to claim 4, further comprising a bracket-like member removably attached to said two inclined parallel rails via fastening members downstream of said device, said bracket-like member being situated above said two inclined parallel rails so as to function as a protection member for the plural preforms travelling along said two inclined parallel rails.

15. The apparatus according to claim 4, wherein said device further includes a pulley and a belt passing over said pulley such that said plural rotary forks are continuously rotatable about the common axis via cooperation of said belt and said pulley.

16. The apparatus according to claim 5, wherein said device further includes a pulley and a belt passing over said pulley such that said plural rotary forks are continuously rotatable about the common axis via cooperation of said belt and said pulley.

17. The apparatus according to claim 1, wherein the common axis about which said plural rotary forks are rotatable is positioned above said gap and extends transversely relative to a vertical plane passing through said gap.

18. The apparatus according to claim 1, wherein said plural rotary forks are angularly spaced from one another and continuously rotatable about the common axis at a rate such that said two outer parallel arms of each of said plural rotary forks are capable of moving into the first position at which collars of respective one preforms of successively adjacent joined preforms are engaged by respective said two outer parallel arms and the second position at which said respective said two outer parallel arms lift and rotate the respective one preforms and respective another preforms of the successively adjacent joined preforms from said gap so as to remove and eject the successively adjacent joined preforms from said two inclined parallel rails.

19. The apparatus according to claim 1, wherein said two outer parallel arms of each of said plural forks are adapted to assume an orientation that is parallel to said two inclined parallel rails when a distance between a respective said two outer parallel arms and said two inclined parallel rails is at most equal to the distance between the upper edge of said two inclined parallel rails and the collar of the one preform.

20. The apparatus according to claim 1, further comprising a bracket-like member removably attached to said two inclined parallel rails via fastening members downstream of said device, said bracket-like member being situated above said two inclined parallel rails so as to function as a protection member for the plural preforms travelling along said two inclined parallel rails.

21. The apparatus according to claim 1, wherein said device further includes a pulley and a belt passing over said pulley such that said plural rotary forks are continuously rotatable about the common axis via cooperation of said belt and said pulley.

* * * * *